United States Patent
Sur (10) Patent No.: US 10,859,459 B2
(45) Date of Patent: Dec. 8, 2020

(54) SYSTEM AND METHOD FOR PRESSURE SENSOR TESTING AND VERIFICATION

(71) Applicant: R.J. REYNOLDS TOBACCO COMPANY, Winston-Salem, NC (US)

(72) Inventor: Rajesh Sur, Winston-Salem, NC (US)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 125 days.

(21) Appl. No.: 16/256,813

(22) Filed: Jan. 24, 2019

(65) Prior Publication Data

US 2020/0240867 A1 Jul. 30, 2020

(51) Int. Cl.
*A24F 47/00* (2020.01)
*G01L 27/00* (2006.01)

(52) U.S. Cl.
CPC .......... *G01L 27/007* (2013.01); *A24F 47/008* (2013.01); *G01L 27/005* (2013.01)

(58) Field of Classification Search
CPC ...................................... A24F 47/00
See application file for complete search history.

(56) References Cited

U.S. PATENT DOCUMENTS

| | | | |
|---|---|---|---|
| 4,819,665 A * | 4/1989 | Roberts | A24F 47/004 131/195 |
| 5,060,671 A | 10/1991 | Counts et al. | |
| 5,388,594 A | 2/1995 | Counts et al. | |
| 5,900,530 A | 5/1999 | O'Brien et al. | |
| 6,164,287 A * | 12/2000 | White | A24F 47/008 131/194 |
| 8,079,371 B2 | 12/2011 | Robinson et al. | |
| 8,245,562 B2 | 8/2012 | Dawson | |
| 8,251,060 B2 * | 8/2012 | White | A61M 11/001 128/203.26 |
| 9,016,274 B1 | 4/2015 | White | |
| 9,078,474 B2 | 7/2015 | Thompson | |
| 9,664,585 B2 | 5/2017 | Stering | |
| 10,512,282 B2 * | 12/2019 | Bowen | A61M 15/0065 |
| 2011/0138936 A1 * | 6/2011 | Collins | B01D 65/104 73/863.23 |

(Continued)

FOREIGN PATENT DOCUMENTS

WO WO-2016/000135 A1 1/2016

*Primary Examiner* — Jewel V Dowtin
(74) *Attorney, Agent, or Firm* — Foley & Lardner LLP (57) ABSTRACT

A system for testing and validating the performance of a pressure sensor includes a test fixture operatively connected to the pressure sensor, and the pressure sensor is configured to identify a fluid pressure relative to an atmospheric pressure. A microcontroller is in electrical communication with the test fixture and the pressure sensor, and the microcontroller is configured to cause the test fixture to introduce air and/or vapor through the pressure sensor at a known fluid pressure. The microcontroller is also configured to receive the identified fluid pressure from the pressure sensor, the identified fluid pressure being based on the air and/or vapor flowing through the pressure sensor. A power source is in electrical communication with the microcontroller, and a display is in electrical communication with the microcontroller. The display is configured to display results to a user, the results comprising the determination of the performance of the pressure sensor.

20 Claims, 4 Drawing Sheets

(56) References Cited

U.S. PATENT DOCUMENTS

| | | |
|---|---|---|
| 2013/0228170 A1* | 9/2013 | Alper .................. A24F 47/006 |
| | | 128/202.21 |
| 2013/0255702 A1 | 10/2013 | Griffith et al. |
| 2014/0000638 A1 | 1/2014 | Sebastian et al. |
| 2014/0060554 A1 | 3/2014 | Collett et al. |
| 2014/0096781 A1 | 4/2014 | Sears et al. |
| 2014/0096782 A1 | 4/2014 | Ampolini et al. |
| 2015/0059780 A1 | 3/2015 | Davis et al. |
| 2019/0191657 A1* | 6/2019 | Enickl ................. G01F 25/0053 |

\* cited by examiner

SYSTEM AND METHOD FOR PRESSURE SENSOR TESTING AND VERIFICATION

TECHNICAL FIELD

The present invention relates to pressure sensor testing and verification. More particularly, the present invention relates to verifying the operating parameters of a pressure sensor and determining whether the pressure sensor becomes clogged during use.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. App. Pub. No. 2013/0255702 to Griffith Jr. et al., U.S. Pat. App. Pub. No. 2014/0000638 to Sebastian et al., U.S. Pat. No. 5,060,671 to Counts et al.; U.S. Pat. No. 9,016,274 to White; U.S. Pat. No. 9,078,474 to Thompson; U.S. Pat. App. Pub. No. 2014/0060554 to Collett et al., U.S. Pat. App. Pub. No. 2014/0096781 to Sears et al., U.S. patent application Ser. No. 13/826,929 to Ampolini et al., filed Mar. 14, 2013, and U.S. patent application Ser. No. 14/011,992 to Davis et al., filed Aug. 28, 2013, which are incorporated herein by reference in their entireties. See also, for example, the various embodiments of products and heating configurations described in the background sections of U.S. Pat. No. 5,388,594 to Counts et al. and U.S. Pat. No. 8,079,371 to Robinson et. al, which are incorporated by reference in their entireties.

Popular electronic or electrically powered smoking articles (e.g., electronic cigarettes, E-cigarettes, etc.) (referred to herein collectively as "electronic smoking articles") often include a liquid storage component for storing aerosol precursor material (e.g., aerosol forming agent, liquid smoke, etc.), a vaporizing chamber with a heating coil attached for the aerosol precursor material to become vaporized therein, and a battery to power the device. The heating coil material typically includes a nickel/chromium wire, a titanium wire, nichrome wire, or similar alloy wires. The aerosol precursor material typically includes a mixture of propylene glycol, glycerin, nicotine, water and flavoring. Various electronic smoking articles have a single device which houses both the heating element and the aerosol precursor material in one unit, commonly referred to as a cartomizer.

Certain tobacco products that have employed electrical energy to produce heat for smoke or aerosol formation, and in particular, certain products that have been referred to as electronic cigarette products or electronic smoking articles, have been commercially available throughout the world. Representative products that resemble many of the attributes of traditional types of cigarettes, cigars or pipes have been marketed as ACCORD® by Philip Morris Incorporated; ALPHA™, JOYE 510™ and M4™ by InnoVapor LLC; CIRRUS™ and FLING™ by White Cloud Cigarettes; COHITA™, COLIBRI™, ELITE CLASSIC™, MAGNUM™, PHANTOM™ and SENSE™ by Epuffer® International Inc.; DUOPRO™, STORM™ and VAPORKING® by Electronic Cigarettes, Inc.; EGAR™ by Egar Australia; eGo-C™ and eGo-T™ by Joyetech; ELUSION™ by Elusion UK Ltd; EONSMOKE® by Eonsmoke LLC; GREEN SMOKE® by Green Smoke Inc. USA; GREENARETTE™ by Greenarette LLC; HALLIGAN™ HENDU™ JET™, MAXXQ™ PINK™ and PITBULL™ by Smoke Stik®; HEATBAR™ by Philip Morris International, Inc.; HYDRO IMPERIAL™ and LXE™ from Crown7; LOGIC™ and THE CUBAN™ by LOGIC Technology; LUCI® by Luciano Smokes Inc.; METRO® by Nicotek, LLC; NJOY® and ONEJOY™ by Sottera, Inc.; NO. 7™ by SS Choice LLC; PREMIUM ELECTRONIC CIGARETTE™ by PremiumEstore LLC; RAPP E-MYSTICK™ by Ruyan America, Inc.; RED DRAGON™ by Red Dragon Products, LLC; RUYAN® by Ruyan Group (Holdings) Ltd.; SMART SMOKER® by The Smart Smoking Electronic Cigarette Company Ltd.; SMOKE ASSIST® by Coastline Products LLC; SMOKING EVERYWHERE® by Smoking Everywhere, Inc.; V2CIGS™ by VMR Products LLC; VAPOR NINE™ by VaporNine LLC; VAPOR4LIFE® by Vapor 4 Life, Inc.; VEPPO™ by E-CigaretteDirect, LLC and VUSE® by R. J. Reynolds Vapor Company. Yet other electrically powered aerosol delivery devices, and in particular those devices that have been characterized as so-called electronic cigarettes, have been marketed under the tradenames BLU™; COOLER VISIONS™; DIRECT E-CIG™; DRAGONFLY™; EMIST™; EVERSMOKE™; GAMUCCI®; HYBRID FLAME™; KNIGHT STICKS™; ROYAL BLUES™; SMOKETIP® and SOUTH BEACH SMOKE™. In some of these electronic smoking articles, when the user inhales on the electronic smoking article, aerosol precursor material is 'pulled' from the reservoir into a vaporizing chamber using gravity and capillary in the wick. The aerosol precursor material is either adsorbed or resting on the electronic smoking article's heating apparatus and heated until it becomes vapor. The vapor is drawn away from the heated region of the device, where it subsequently cools and condenses into a high number density, generally sub-micron aerosol whereupon it then exits the device. The wick material can include any combination of silica, organic cotton, cellucotton rayon fibers, stainless steel, fiberglass, ceramic, and other materials with similar properties.

Pressure sensors are used within the e-cigarette to sense when a user is inhaling. Pressure sensors typically comprise transducers that generate signals (e.g., an electrical signal) in response to the pressure being sensed. The signal is then converted to a pressure value and provided to a user or to other equipment. Pressure sensors can be used to measure a variety of characteristics such as pressure, altitude, flow, depth, and leaks. There are many different types of pressure sensors, including piezoelectric, capacitive, electromagnetic, strain-gauges, optical, potentiometric, resonant, and thermal sensors. In an e-cigarette, when the pressure sensor determines that a user is inhaling, the sensor sends a signal to the heating coils within the vaporizing chamber, and the heating coils heat up the liquid in the vaporizing chamber to create the vapor the user inhales. The pressure sensor in an e-cigarette is designed to send the signal to the vaporizing chamber (e.g., atomizer) when the pressure surpasses a certain pressure threshold (e.g., when the sensor determines a pressure that indicates a user is inhaling), so it is important for the pressure sensor to meet the sensor specifications from the sensor manufacturer. If the pressure sensor does not meet the specifications, the sensor may not send a signal to the atomizer at the right time, resulting the liquid not being vaporized for the user. In addition, it is important for the pressure sensor to remain unclogged within the e-cigarette in order to accurately determine whether the user is inhaling. A clogged pressure sensor may fail to determine that a user is inhaling, and the result may be that the sensor does not cause the atomizer to heat and vaporize the liquid, resulting in no vapor in the e-cigarette.

SUMMARY

One embodiment relates to a system for testing and validating the performance of a pressure sensor. A test fixture is operatively connected to the pressure sensor, and the pressure sensor is configured to identify a fluid pressure relative to an atmospheric pressure. A microcontroller is in electrical communication with the test fixture and the pressure sensor. The microcontroller is configured to cause the test fixture to introduce air and/or vapor through the pressure sensor at a known fluid pressure and receive the identified fluid pressure from the pressure sensor, the identified fluid pressure being based on the air and/or vapor flowing through the pressure sensor. The microcontroller is further configured to make a determination regarding the performance of the pressure sensor, the determination being based on the identified fluid pressure and the atmospheric pressure. A display is in electrical communication with the microcontroller, and the display is configured to display results to a user, the results comprising the identified fluid pressure and the atmospheric pressure.

Another embodiment relates to a system for testing and validating the performance of a pressure sensor. A puffing machine is coupled to a pressure sensor, and the pressure sensor is configured to identify an inhalation pressure relative to an atmospheric pressure and an exhalation pressure relative to the atmospheric pressure. The puffing machine is configured to provide a known inhalation pressure and a known exhalation pressure. A microcontroller is in electrical communication with the puffing machine and the pressure sensor, and the microcontroller is configured to cause the puffing machine to introduce air and/or vapor through the pressure sensor at the known inhalation pressure and introduce air and/or vapor through the pressure sensor at the known exhalation pressure. The microcontroller is further configured to receive the identified inhalation pressure and the identified exhalation pressure from the pressure sensor, the identified inhalation pressure being based on the air and/or vapor flowing through the pressure sensor at the known inhalation pressure and the identified exhalation pressure being based on the air and/or vapor flowing through the pressure sensor at the known exhalation pressure. The microcontroller is further configured to make a determination regarding the performance of the pressure sensor, the determination being based on the identified inhalation pressure, the identified exhalation pressure, the atmospheric pressure, the known inhalation pressure, and the known exhalation pressure. A display is in electrical communication with the microcontroller, and the display is configured to display results to a user, the results comprising the identified inhalation pressure, the identified exhalation pressure, the known inhalation pressure, the known exhalation pressure, and the atmospheric pressure.

Still another embodiment relates to a method of validating the performance of a pressure sensor. A testing system is provided, the testing system comprising a test fixture configured to be operatively connected to a pressure sensor, and the pressure sensor configured to identify a fluid pressure relative to an atmospheric pressure. The testing system also comprises a microcontroller in electrical communication with the test fixture and the pressure sensor, and a display in electrical communication with the microcontroller. The display is configured to display results to a user, the results comprising the identified fluid pressure and the atmospheric pressure. The test method comprises causing the test fixture to introduce air and/or vapor at a known fluid pressure through the pressure sensor, and identifying the fluid pressure of the air and/or vapor flowing through the pressure sensor. The test method further comprises making a determination regarding the performance of the pressure sensor, the determination being based on the identified fluid pressure and the atmospheric pressure, and displaying the fluid pressure results on a display.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

DETAILED DESCRIPTION

Referring generally to the Figures, a test setup and test method are shown to verify the accuracy and functionality of a pressure sensor. A producer may purchase a pressure sensor from a manufacturer that has a particular pressure rating (e.g., the pressure sensor is designed to accurately sense pressure up to a certain pressure level) for inclusion in a product that operates based on the internal pressure in the product. However, the producer has no clear indication that the pressure sensor it purchased adheres to the pressure ratings assigned to it by the manufacturer. If a product fails in the market, the producer may not know if the product failed due to a failure of the pressure sensor or a failure of other components. Furthermore, if the pressure sensor failed the producer may not know if the pressure sensor failed because it did not meet the standards of the manufacturer or because the pressure sensor became clogged. A test setup according to various embodiments may be used to verify the accuracy of the pressure sensor to be used prior to producing a product and for use in product failure investigations.

A test setup according to various embodiments comprises a microcontroller connected to a test fixture that included the pressure sensor in question. Upon connecting the microcontroller to a power source, the microcontroller instructs the test fixture to carry out a test protocol to test the accuracy and function of the pressure sensor. The output from the pressure sensor is relayed to the microcontroller, and the microcontroller forwards the results to a user to view on a display. The user can then determine whether the pressure sensor was accurately measuring pressure and/or functioning properly by examining the results on the display.

Figure 1:
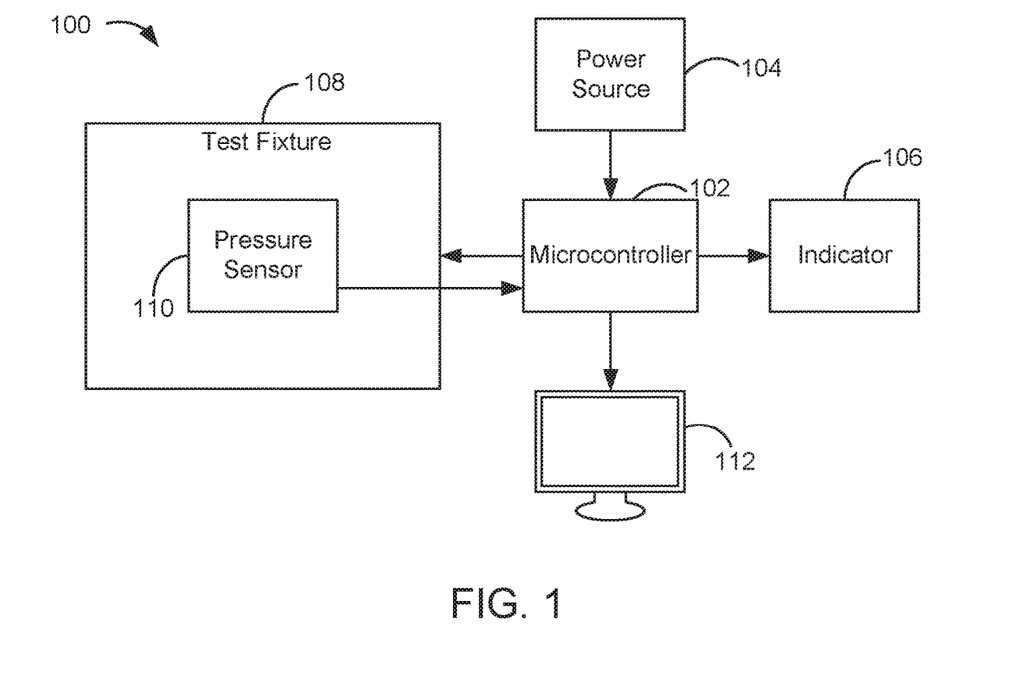
FIG. 1 is a block diagram of a testing system, according to a particular embodiment.

Referring now to FIG. 1, a block diagram of a testing system 100 is shown, according to a particular embodiment. The testing system 100 includes a microcontroller 102, a power source 104, an indicator 106, a test fixture 108, a pressure sensor 110, and a display 112.

The microcontroller 102 is in electrical communication with the power source 104, the indicator 106, the test fixture 108, the pressure sensor 110, and the display 112. The microcontroller 102 can be any type of device that includes one or more central processing units (CPUs), a memory, and programmable input/output peripherals that is configured to control the performance of a device or system.

The power source 104 is in electrical communication with the microcontroller 102 and is configured to provide power to the microcontroller 102 such that the microcontroller 102 is operable. Non-limiting examples of the power source 104 include batteries, AC power, DC power, etc.

The indicator 106 is in electrical communication with the microcontroller 102 and is configured to provide an indication to a user when the microcontroller 102 is operational. Non-limiting examples of the indicator 106 include lights (e.g., light emitting diodes, incandescent bulbs, etc.), sounds (e.g., alarms, beeps, etc.), and haptics (e.g., vibration, force feedback, etc.).

The test fixture 108 is in electrical communication with the microcontroller 102 and is configured to run a test protocol based on instructions from the microprocessor 102. The test fixture 108 may be any test setup configured to secure the pressure sensor 110 and provide the pressure sensor 110 with different pressures to measure. An example of a test fixture incorporating a puffing machine will be further described with reference to FIG. 3A.

The pressure sensor 110 is in electrical communication with the microcontroller 102 and is configured to determine the pressure in the surrounding environment (e.g., the atmospheric pressure) and the pressure imparted to it by the test fixture 108 and provide pressure measurements to the microcontroller 102. The pressure sensor 110 may be any of the types of pressure sensors described above.

The display 112 is in electrical communication with the microcontroller 102 and is configured to display the pressure measurements from the pressure sensor 110 to a user. Non-limiting examples of the display 112 include computer monitors, tablet computers, mobile devices, television screens, etc.

In operation, a user may desire to test the accuracy and/or the functionality of the pressure sensor 110. To do so, the user installs the pressure sensor 110 in the test fixture 108 such that the pressure sensor 110 is in fluid communication with the test fixture 108. In some embodiments, the test fixture 108 may be designed to impart a positive pressure or a negative pressure to the pressure sensor 110. For example, the test fixture 108 may be designed to induce a fluid flow in a single direction through the pressure sensor 110 and cause the pressure sensor 110 to identify (e.g., read, sense, measure, etc.) the pressure of the fluid passing through the pressure sensor 110. In other embodiments, the test fixture 108 may be designed to impart a positive pressure and a negative pressure to the pressure sensor 110. For example, the test fixture 108 may be designed to induce a vapor flow through the pressure sensor 110 that flows in one direction for a specified period of time and then flows in the opposite direction for a specified period of time, thereby simulating an inhalation and exhalation process.

The user then connects the test fixture 108 to the microcontroller 102, and the microcontroller 102 includes a program to run the test fixture 108 to impart a known pressure to the pressure sensor 110. In some embodiments, the pressure sensor 110 is in electrical communication with the microcontroller 102 via an electrical connection with the test fixture 108. In other embodiments, the pressure sensor 110 is in electrical communication directly with the microcontroller 102. In some implementations, the microcontroller 102 may include a program for the test fixture 108 that causes the test fixture 108 to create a known pressure to be imparted to the pressure sensor 110 such that the pressure sensor 110 senses and identifies the pressure. When the microcontroller 102 sends a signal to the test fixture 108 to begin the test, the indicator 106 turns on to the notify the user that the test is running.

In some embodiments, the pressure sensor 110 may identify the atmospheric pressure as a baseline pressure from which to compare other pressures identified (e.g., read, sensed, measured, etc.) during the testing process. For example, at sea level the atmospheric pressure is approximately 14.7 pounds per square inch ("PSI"), or $1.01 \times 10^5$ Pascals (Pa). When the pressure sensor 110 identifies the pressure generated by the test fixture 108, if the pressure identified is greater than the atmospheric pressure, the pressure sensor 110 will identify the pressure as a positive pressure relative to the atmospheric pressure. If the pressure identified by the pressure sensor 110 is less than the atmospheric pressure, the pressure sensor 110 will identify the pressure as a negative pressure relative to the atmospheric pressure.

In some embodiments, the pressure sensor 110 may be configured to initiate communication with the microcontroller 102 upon detecting an incremental change in pressure compared to a certain atmospheric pressure threshold (e.g. more than 10 percent above or below the atmospheric pressure). For example, if the pressure sensor 110 is configured to detect an incremental change of 50 to 150 Pa, the pressure sensor 110 may initiate communication with the microcontroller 102 if the incremental change is 45 Pa (e.g., 10 percent below the minimum) to 165 Pa (e.g., 10 percent above the maximum). By identifying the pressure in this manner (e.g., by identifying the pressure relative to the atmospheric pressure), misleading pressure measurements can be eliminated because the pressure sensor 110 will not confuse a slight change in atmospheric pressure (e.g., moving from sea level to a higher elevation) for a pressure change to initiate communication with the microcontroller 102.

As the pressure sensor 110 identifies the pressure, the pressure sensor 110 sends the pressure measurements to the microcontroller 102, which then provides the measurements to the display 112 such that the user can view the results. In some embodiments, the user views the results and determines whether the pressure sensor 110 is functioning properly by comparing the atmospheric pressure identified by the pressure sensor 110 to the true atmospheric pressure. In other embodiments, the user determines whether the pressure sensor 110 is functioning properly by comparing the identified pressure to the known pressure imparted by the test fixture 108. In some implementations, the microcontroller 102 analyzes the results and determines whether the pressure sensor 110 is functioning properly by comparing the atmospheric pressure identified by the pressure sensor 110 to the true atmospheric pressure. In other implementations, the microcontroller 102 analyzes the results and determines whether the pressure sensor 110 is functioning properly by comparing the identified pressure to the known pressure imparted by the test fixture 108. Results will be further described with respect to FIGS. 5-6.

In some embodiments, the microcontroller 102 compares the atmospheric pressure identified by the pressure sensor 110 to the true atmospheric pressure and notifies the user if the atmospheric pressure identified by the pressure sensor 110 is lower than a threshold amount (e.g., within 10 percent of the true atmospheric pressure), indicating that there may be a problem with the pressure sensor 110. In other embodiments, the microcontroller 102 compares the identified pressure to the known pressure imparted by the test fixture 108 and notifies the user if the identified pressure differs from the known pressure by more than a threshold amount (e.g., within 10 percent of the known pressure), indicating that there may be a problem with the sensor. The threshold amount may change (e.g., the threshold may be higher or lower) based on the test setup and/or the pressure sensor 110 that is being tested.

The notification to the user can be via the indicator 106. For example, if the microcontroller 102 determines that the pressure sensor 110 is not working properly, the indicator 106 may blink rapidly. In other embodiments, the function of the indicator 106 can be implemented via the display 112. For example, if the microcontroller 102 determines that the pressure sensor 110 is not working properly, the microcontroller 102 may cause the display 112 to provide text, flashing lights, symbols, or combinations thereof to the user.

Figure 2:
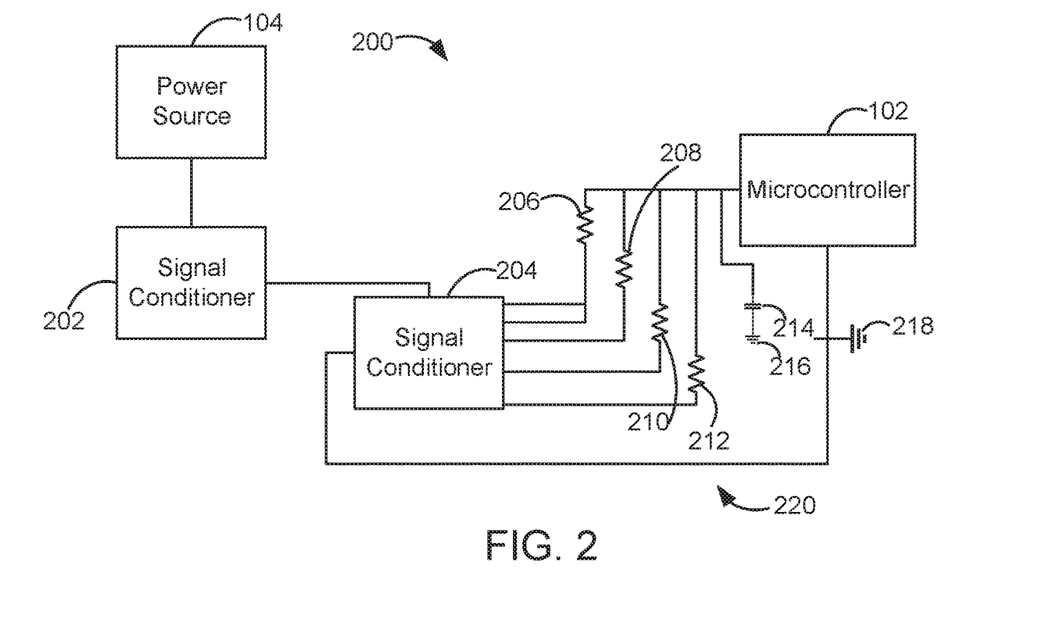
FIG. 2, is a block diagram of a signal conditioning portion of the testing system of FIG. 1.

FIG. 2 is a block diagram of a signal conditioning portion 200 of the testing system 100 of FIG. 1. The signal conditioning portion 200 includes a first signal conditioner 202, a second signal conditioner 204, a first resistor 206, a second resistor 208, a third resistor 210, a fourth resistor 212, a capacitor 214, a conditioner ground 216, and a microcontroller ground 218.

The first signal conditioner 202 is in electrical communication with the power source 104 and the second signal conditioner 204. The first signal conditioner 202 can be any type of signal conditioner that is configured to remove noise from the power generated by the power source 104 (e.g., a signal isolator). For example, if the power source 104 is an alternating current ("A/C") power source, the power generated by the A/C power source contains noise (e.g., interference) that can reduce the performance of the devices to which the A/C power source is connected. Connecting a signal conditioner like the first signal conditioner 202 in between the power source 104 and sensitive equipment like the microcontroller 102 helps to remove signal noise and provide the correct voltage to sensitive devices like the microcontroller 102 such that the microcontroller 102 operates properly.

The second signal conditioner 204 is in electrical communication with the first signal conditioner 202 and the microcontroller 102. The second signal conditioner 204 can be any type of signal conditioner that is configured to remove any residual noise from the power signal that was not removed by the first signal conditioner 202 (e.g., a signal isolator). For example, the first signal conditioner 202 may remove the majority of the noise originating from the power source 104, however some additional signal noise may continue to be present. Because the performance of sensitive electrical equipment like the microcontroller 102 may be negatively affected by the presence of noise in the power signal, the power to the microcontroller 102 should be as noiseless as possible. The second signal conditioner 204 removes the residual noise left by the first signal conditioner 202 such that the power to the microcontroller 102 is substantially noiseless.

The first resistor 206, the second resistor 208, the third resistor 210, the fourth resistor 212, the capacitor 214, the conditioner ground 216, and the microcontroller ground 218 create a circuit 220 through which the conditioned power flows from the signal conditioner 204 to the microcontroller 102. In some embodiments, the first resistor 206, the second resistor 208, the third resistor 210, and the fourth resistor 212 are all equivalent resistances (e.g., 1 kilo-Ohm). In other embodiments, at least one of the first resistor 206, the second resistor 208, the third resistor 210, the fourth resistor 212 is not an equivalent resistance to the other resistors. In some implementations, the capacitor 214 is one micro-Farad. In other implementations, the capacitor 214 may include other capacitive values. In some iterations, the circuit 220 creates a voltage of 5 volts entering the microcontroller 102. In other iterations, the circuit 220 creates a different voltage that enters the microcontroller 102.

Figure 3A:
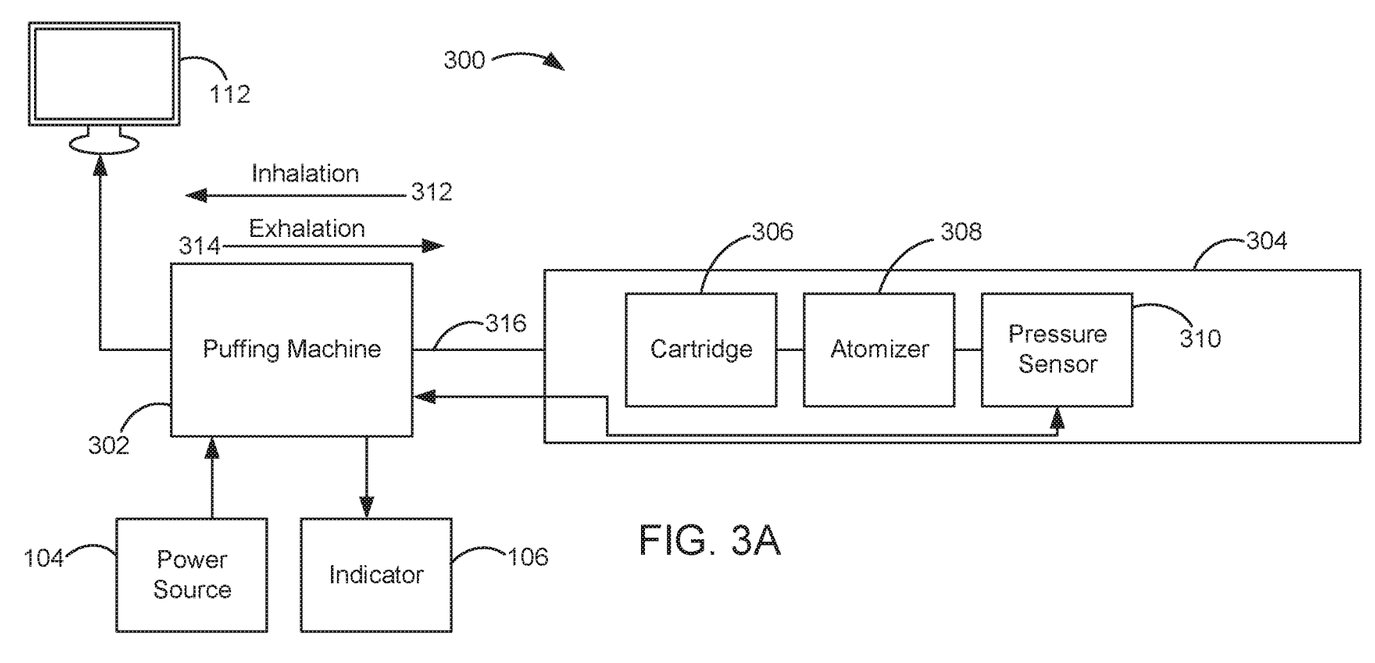
FIG. 3A is a block diagram of another testing system, according to a particular embodiment.

FIG. 3A is a block diagram of another testing system 300, according to a particular embodiment. The testing system 300 includes a puffing machine 302, a housing 304, a cartridge 306, an atomizer 308, a pressure sensor 310, a tube 316, the power source 104, the indicator 106, and the display 112.

The puffing machine 302 is in electrical communication with the power source 104, the indicator 106, the display 112, and the pressure sensor 310. The puffing machine 302 is also releasably coupled to the housing 304 via the tube 316. The puffing machine 302 is a machine configured to simulate a user smoking an e-cigarette. The puffing machine 302 includes a microcontroller similar to the microcontroller 102 to control the smoking test process. The smoking test process includes an inhalation portion in which the puffing machine 302 pulls air through the tube 316 in the direction of the inhalation arrow 312 to simulate a user inhaling. The smoking test process also includes an exhalation portion in which the puffing machine 302 pushes air through the tube 316 in the direction of the exhalation arrow 314 to simulate a user exhaling. In some embodiments, the puffing machine 302 only pushes a portion of the air through the tube 316 during the exhalation portion, thereby simulating a user exhaling and holding an e-cigarette in the path of the exhaled air and/or vapor.

The housing 304 is releasably coupled to the puffing machine 302 via the tube 316 and is configured to contain the cartridge 304, the atomizer 308, and the pressure sensor 310. In some embodiments, the housing 304 can be the housing of an e-cigarette wherein the tube 316 is connected to the mouthpiece of the e-cigarette housing. In other embodiments, the housing 304 can be any other container configured to secure the cartridge 306, the atomizer 308, and the pressure sensor 310 such that testing can reliably occur, and the tube 316 can be connected to the housing 304 by any means to effectively couple the housing 304 to the puffing machine 302.

The cartridge 306 is in communication with the atomizer 308 and is configured to contain the nicotine liquid typically found in an e-cigarette. The atomizer 308 is in communication with the cartridge 306 and the pressure sensor 310 and is configured to heat the nicotine liquid to create a nicotine vapor that a user can inhale when using an e-cigarette. The atomizer 306 can include a heating element and a wicking element. The wicking element can draw the nicotine liquid into the atomizer 306 where the heating element rapidly heats the nicotine liquid to its boiling point, thereby creating an aerosolized vapor.

The pressure sensor 310 is in communication with the puffing machine 302 and the atomizer 308 and is configured to identify the inhalation pressure and exhalation pressure within the housing 304 and activate the atomizer 306 to heat the nicotine liquid upon sensing a specific inhalation pressure. The pressure sensor 310 can be of any type previously described that is capable of measuring a fluid pressure.

The tube 316 is in fluid communication with the puffing machine 302 and the housing 304 and is configured to allow the puffing machine 302 to pull air and/or vapor from the housing 304 in the direction of the inhalation arrow 312. The tube 316 is further configured to allow the puffing machine 302 to push air and/or vapor from the puffing machine 302 toward the housing 304 in the direction of the exhalation arrow 314. The tube 316 can be constructed of any material to provide for this functionality including, but not limited to, plastics (e.g., ABS, polyethylene, polycarbonate, etc.) and metals (e.g., stainless steel, aluminum, etc.).

In operation, a user may desire to test the pressure sensor 310 from an e-cigarette to determine whether the pressure sensor 310 is clogged and therefore prevented from operating properly. The user either connects the e-cigarette housing (e.g., the housing 304) to the tube 316 or removes the cartridge 306, the atomizer 308, and the pressure sensor 310 from the e-cigarette housing and assembles the parts in a different housing 304 such that the housing 304 is connected to the tube 316.

After the parts are connected, the user turns on the puffing machine 302 and initiates the testing process. The user may choose to test continuously (e.g., multiple inhalation and exhalation cycles) or discretely (e.g., a single inhalation/exhalation cycle or single inhalation or exhalation). The ways in which a user chooses the method of testing will be further described with reference to FIGS. 5 and 6.

If the user chooses to initiate a continuous test, the puffing machine 302 begins the testing process by initiating an inhalation cycle, where the puffing machine 302 attempts to draw air and/or vapor from the housing 304 in the direction of the inhalation arrow 312 at a known inhalation pressure. When the puffing machine 302 attempts to draw air and/or vapor from the housing 304, the pressure sensor 310 identifies the inhalation pressure of the air and/or vapor flowing through the pressure sensor 310 compared to the atmospheric pressure. If the pressure sensor 310 is operating properly, upon identifying the inhalation pressure (e.g., a negative pressure relative to the atmospheric pressure) the pressure sensor 310 sends a signal to the atomizer 308 to cause the atomizer 308 to heat the nicotine liquid in the cartridge 306 to create a vapor. When the inhalation cycle is complete, the puffing machine 302 stops imparting the known inhalation pressure to the housing 304. If the pressure sensor 310 is operating properly, upon identifying the absence of the inhalation pressure (e.g., zero pressure relative to the atmospheric pressure) the pressure sensor 310 stops sending a signal to the atomizer 308, and the atomizer 308 stops creating a vapor from the nicotine liquid.

The puffing machine 302 then simulates exhalation by pushing air and/or vapor out of the puffing machine 302 at a known exhalation pressure. In some embodiments, all of the air and/or vapor drawn from the housing 304 during the inhalation cycle is pushed back through the tubing 316 during the exhalation cycle. In other embodiments, only a portion of the air and/or vapor drawn from the housing 304 during the inhalation cycle is pushed back through the tubing 316 during the exhalation cycle. When the puffing machine 302 attempts to push air and/or vapor through the housing 304, the pressure sensor 310 identifies the exhalation pressure of the air and/or vapor flowing through the pressure sensor 310 compared to the atmospheric pressure. If the pressure sensor 310 is operating properly, the exhalation pressure is identified as a positive pressure relative to the atmospheric pressure. During the exhalation cycle, the pressure sensor 310 does not send a signal to the atomizer 306 because the pressure being identified by the pressure sensor 310 is the exhalation pressure (e.g., a positive pressure relative to the atmospheric pressure), which indicates the user is not attempting to draw any nicotine liquid at that time.

During the inhalation and exhalation cycles, the pressure sensor 310 is communicating with the puffing machine 302, the communication including the fluid pressures identified by the pressure sensor 310 during the cycles. In some embodiments, the puffing machine 302 may provide the fluid pressures identified by the pressure sensor 310 to the display 112 such that the user can determine whether the pressure sensor 310 is operating properly. In some embodiments, the user views the results and determines whether the pressure sensor 310 is functioning properly. In other embodiments, the puffing machine 302 analyzes the results and determines whether the pressure sensor 310 is functioning properly.

In some embodiments, the puffing machine 302 compares the pressure measurements made by the pressure sensor 310 to the atmospheric pressure and notify the user if the measurements made by the pressure sensor 310 are lower than a threshold amount (e.g., within 10 percent of the atmospheric pressure), indicating that there may be a problem with the pressure sensor 310. The threshold amount may change (e.g., the threshold may be higher or lower) based on the test setup and/or the pressure sensor 310 that is being tested. The notification to the user can be via the indicator 106. For example, if the puffing machine 302 determines that the pressure sensor 310 is not working properly, the indicator 106 may blink rapidly. In other embodiments, the function of the indicator 106 can be implemented via the display 112. For example, if the puffing machine 302 determines that the pressure sensor 310 is not working properly, the puffing machine 302 may cause the display 112 to provide text, flashing lights, symbols, or combinations thereof to the user to indicate the results.

In other embodiments, the puffing machine 302 compares the pressure measurements made by the pressure sensor 310 to the known inhalation and exhalation pressures imparted by the puffing machine 302 to the pressure sensor 310. For example, the puffing machine 302 may impart a known inhalation pressure of −7 PSI. For the puffing machine 302 to determine that the pressure sensor 310 is operating properly (e.g., not clogged), the pressure sensor 310 must identify an inhalation pressure within a threshold amount (e.g., 10 percent) of the known inhalation pressure). If the pressure sensor 310 does not identify an inhalation pressure within the threshold amount of the known inhalation pressure, the puffing machine 302 determines that the pressure sensor 310 is not operating properly.

In another embodiment of the testing system 300, the cartridge 306 and the atomizer 308 may be omitted. As the focus of the testing system 300 is to determine whether the pressure sensor 310 is operating properly, the cartridge 306 and the atomizer 308 may not be required to make this determination. In the instance where the cartridge 306 and the atomizer 308 are omitted, the pressure sensor 310 is contained within the housing 304 and connected to the puffing machine 302. The inhalation and exhalation cycles are conducted as discussed above, and the pressure sensor 310 identifies the inhalation and exhalation pressures within a threshold amount (e.g., 10 percent) of the known inhalation and exhalation pressures if the pressure sensor 310 is operating properly. The only difference is that the pressure sensor 310 does not induce the atomizer 306 to heat the nicotine liquid.

Figure 3B:
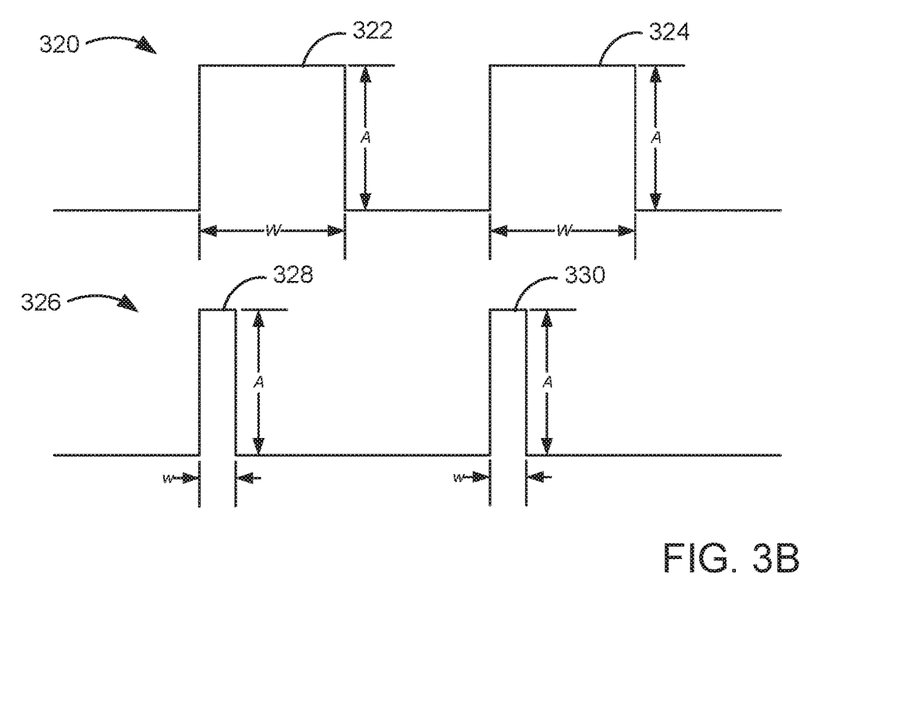
FIG. 3B is an example illustration of electrical pulses provided to a pressure sensor by a testing system, according to a particular embodiment.

FIG. 3B is an illustration of electrical pulses provided to the pressure sensor 310 by the puffing machine 302, according to a particular embodiment. Pulse wave 320 includes a first pulse 322 and a second pulse 324. Pulse wave 326 includes a third pulse 328 and a fourth pulse 330. The first pulse 322 and the second pulse 324 have an amplitude A and a width W. The third pulse 328 and the fourth pulse 330 have an amplitude A and a width w. The amplitude A indicates the intensity of an electrical signal sent from the puffing machine 302 to the pressure sensor 310. The widths W and w indicate the duration of the electrical signal sent from the puffing machine 302 to the pressure sensor 310.

In some embodiments, the pressure sensor 310 is activated when air and/or vapor flows through it, as previously described. In other embodiments, the pressure sensor 310 is activated by the puffing machine 302 prior to initiating a puffing cycle. To activate the pressure sensor 310, the puffing machine 302 sends a signal (e.g., a pulse) to the pressure sensor 310, causing the pressure sensor 310 to begin identifying pressures. Over time, the activation process can be optimized by reducing the size of the pulse until the power required to activate the pressure sensor 302 is minimized, thereby reducing the cost to power the puffing machine 302 (e.g., when the power source 104 is an A/C power source) or conserving the power to the puffing machine 302 (e.g., when the power source 104 is a battery).

For example, the puffing machine 302 may initiate a first testing cycle by sending the first pulse 322 and the second pulse 324 to the pressure sensor 310. The first pulse 322 and the second pulse 324 are sufficient to activate the pressure sensor 310. To conserve energy, when initiating the second testing cycle the puffing machine 302 provides a pulse to the pressure sensor of a duration that is slightly less than W. As long as the pressure sensor 310 continues to activate upon receiving pulses from the puffing machine 302, the puffing machine 302 will continue to attempt to decrease the duration of the pulse sent to activate the pressure sensor 310. When the puffing machine 302 attempts to activate the pressure sensor 310 with a pulse of a duration less than w, the pressure sensor will not activate. The puffing machine 302 then reverts to the previous pulse duration that activated the pressure sensor 310 (e.g., a pulse duration of w used with the third pulse 328 and the fourth pulse 330). In this manner, the puffing machine 302 can decrease the amount of power required to activate the pressure sensor 310.

Figure 4:
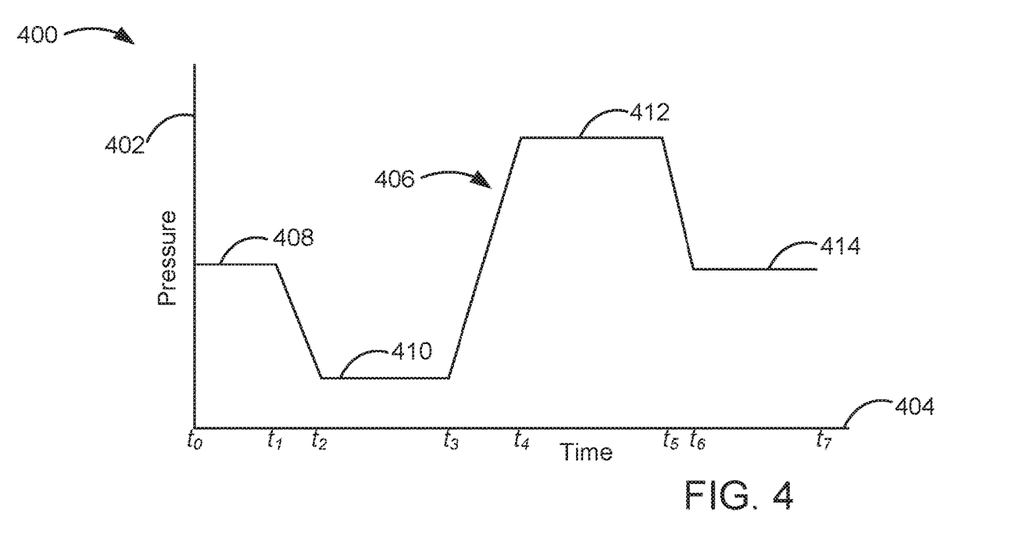
FIG. 4 is an illustration of a chart displayed on the display of the testing system of FIG. 1 or FIG. 3A.

FIG. 4 is an illustration of a chart 400 displayed on the display 112 of the testing system 100 of FIG. 1 or FIG. 3A. In some embodiments, the chart 400 may be generated in real time as pressure data from the pressure sensor 110 or the pressure sensor 310 is provided to the display 112. In other embodiments, the chart 400 may be generated after a testing cycle is complete and pressure data from the pressure sensor 110 or the pressure sensor 310 is provided to the display 112.

The chart 400 includes a y-axis 402 that represents pressure, an x-axis 404 that represents time, and a line 406 that represents the pressure sensed by the pressure sensor 110 or the pressure sensor 310. The line 406 further includes a first atmospheric pressure section 408, a negative pressure section 410, a positive pressure section 412, and a second atmospheric pressure section 414.

When the pressure sensor 110 or the pressure sensor 310 is operating normally and identifying pressure correctly, the display 112 shows a chart like the chart 400. Focusing now on the testing system 300 of FIG. 3A for the purposes of explanation, at time to the test begins and the pressure sensor 310 begins to identify the atmospheric pressure, denoted by the first atmospheric pressure section 408. At time $t_1$, the puffing machine 302 begins the inhalation cycle, drawing air and/or vapor from the housing 304 through the tube 316 at a known inhalation pressure. From time $t_2$ to $t_3$, the inhalation cycle of the puffing machine 302 has reached a steady state, and the pressure sensor 310 identifies a negative pressure denoted by the negative pressure section 410. At time $t_3$, the puffing machine 302 transitions from the inhalation cycle to the exhalation cycle, whereby the puffing machine 302 pushes air and or/vapor toward the housing 304 at a known exhalation pressure. At time $t_4$, the exhalation cycle of the puffing machine 302 has reached a steady state. At that time, the pressure sensor 310 identifies a positive pressure denoted by the positive pressure section 412. At time $t_5$, the puffing machine 302 begins to complete the exhalation cycle, and from time $t_6$ to $t_7$ the puffing machine 302 is not active, thereby simulating a user pausing in between puffs on an e-cigarette. At that time, the pressure sensor 310 identifies the atmospheric pressure denoted by the second atmospheric pressure section 414.

The graph 400 generated by the testing system 300 may continue to add data to the line 406 by conducting additional inhalation and exhalation cycles. In some embodiments, the inhalation and exhalation cycles are continued for a specific amount of time before the test is concluded. In other embodiments, the inhalation and exhalation cycles are continued for a specific number of cycles before the test is concluded. In some instances, only a single inhalation and exhalation cycle is conducted, resulting in a graph similar to that of the graph 400. In other instances, only a single inhalation or exhalation cycle is conducted, resulting in a graph that contains approximately half the data of the graph 400.

If a user conducted a test using the puffing machine 302 and achieved the results indicated by the graph 400, the user may come to the conclusion that the pressure sensor 310 is operating properly. To come to such a conclusion, the user compares the known inhalation and exhalation pressures imparted to the pressure sensor 310 by the puffing machine 302 during the inhalation and exhalation cycles to the pressure values indicated by the negative pressure section 410 and the positive pressure section 412. If the values of the known inhalation pressure match those indicated by the negative pressure section 410 or are within an acceptable range (e.g., plus or minus 10 percent), the pressure sensor 310 is properly reading the negative pressure. If the values of the known exhalation pressure match those indicated by the positive pressure section 412 or are within an acceptable range (e.g., plus or minus 10 percent), the pressure sensor 310 is properly reading the positive pressure.

If there are discrepancies between the expected pressure readings based on the known inhalation and exhalation pressures imparted by the puffing machine 302 and the pressures identified by the pressure sensor 310 indicated by the negative pressure section 410 and the positive pressure section 412, a user may conclude that the pressure sensor 310 is not operating properly. For example, during the exhalation cycle the user may notice that the pressure sensor 310 is identifying a pressure that is equal to the absolute pressure instead of identifying a pressure that is negative relative to the absolute pressures. Such a result indicates to the user that the pressure sensor 310 is not operating properly and/or may be clogged by vapor particles. In some embodiments, the graph 400 may include an expected pressure line in addition to the line 406 to indicate to the user what the line 406 should look like if the pressure sensor 310 is operating properly. The user visually compares the line 406 to the expected pressure line to determine whether the pressure sensor 310 is operating properly. The expected pressure line may also include bands to show the acceptable ranges of the identified inhalation and exhalation pressures. In some implementations, the user determines whether pressure sensor 310 is operating properly by visually comparing the identified inhalation and exhalation pressures to the known inhalation and exhalation pressures. In other implementations, the puffing machine 302 determines whether the pressure sensor 302 is operating properly by comparing the identified inhalation and exhalation pressure to the known inhalation and exhalation pressures.

Furthermore, in some embodiments the user determines whether the pressure sensor 310 is operating properly by examining the atmospheric pressure identified by the pressure sensor 310 (e.g., the first atmospheric pressure section 408 and the second atmospheric pressure section 414). If the pressure sensor 310 is not operating properly, it may indicate that the atmospheric pressure is negative during the inhalation/exhalation cycles, thereby indicating to the user that there may be a problem with the pressure sensor 310. In other embodiments, the puffing machine 302 determines whether the pressure sensor 310 is operating properly by analyzing the atmospheric pressure identified by the pressure sensor 310 in a manner similar to that described above and provides an indication of the determination accordingly.

Figure 5:
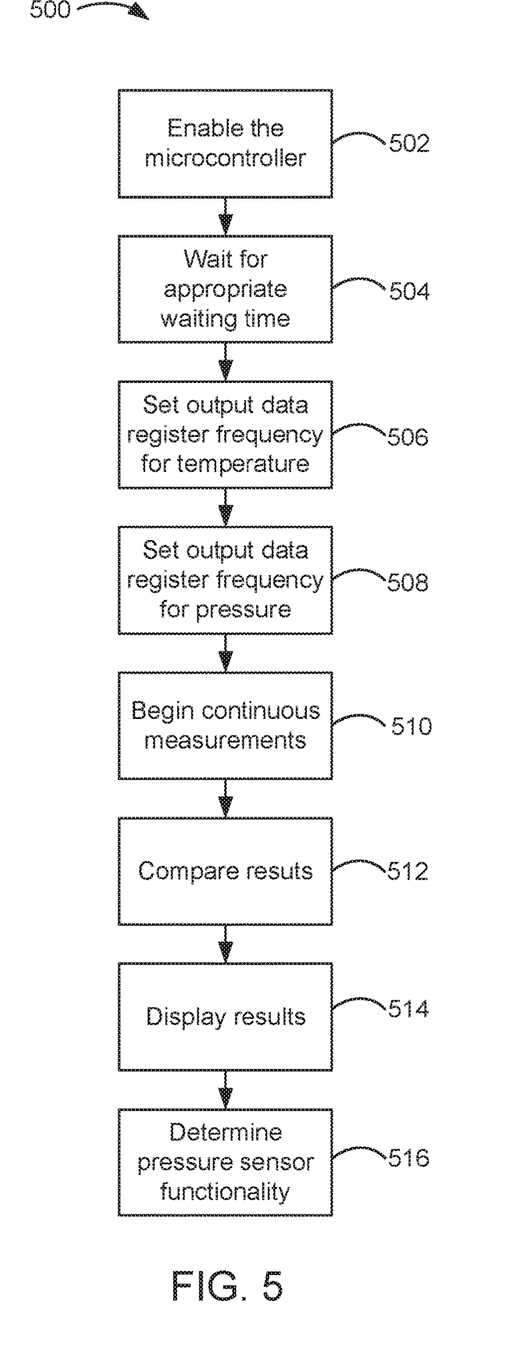
FIG. 5 is a flow diagram of a process for continuously measuring pressure, according to a particular embodiment.

FIG. 5 is a flow diagram of a process 500 for validating the function of a pressure sensor by continuously identifying pressure, according to a particular embodiment. The process 500 may be implemented by the microcontroller 102 of FIG. 1 or the puffing machine 302 of FIG. 3A. For purposes of explanation, the process 500 will be described in terms of the microcontroller 102.

The process 500 begins and the microcontroller is enabled (action 502). For example, in some embodiments user may enable the microcontroller 102 by actuating a switch or button to turn on and enable the microcontroller 102. In other embodiments a user may plug in the microcontroller 102 to turn on and enable the microcontroller 102.

The user then waits for the appropriate waiting time (action 504). For example, after enabling the microcontroller 102, the microcontroller 102 may need to execute some startup tasks or programs in order to prepare itself to send serial peripheral interface ("SPI") commands and/or inter-integrated circuit ("I²C") commands to the device(s) connected to the microcontroller 102. This action may also include time for the microcontroller 102 to clear out any settings that were previously used (e.g., clearing a first in/first out or setting the first in/first out to bypass mode). In some embodiments, the user can clear out the settings previously used, if so desired.

After waiting the appropriate time, the user then sets the output data register frequency for temperature (action 506). For example, in some embodiments it may be desirable to identify not only the pressure, but the temperature in the test system 100 to determine if the temperature impacts the function of the test system 100. In such cases, the user can set the frequency of temperature measurement to the desired rate (e.g., 1 Hz.). In some embodiments, the user can also set the number of temperature measurements to take during the testing cycle (e.g., 1 measurement).

The user then sets the output data register frequency for pressure (action 508). For example, in some implementations the user may desire to gather as much data as possible from the pressure sensor 110 and therefore set the measurement frequency to a high number (e.g., 16 Hz.), understanding that a higher frequency of measurements may compromise the overall accuracy of the measurements. In other implementations a user may desire to record very accurate measurements from the pressure sensor 110 and therefore set the measurement frequency to a low number (e.g., 2 Hz.), understanding that the lower frequency of measurements will provide higher accuracy but a lower number of overall data points.

The user then begins the continuous measurement cycle (action 510). For example, in some instances the user may actuate a switch or button on the testing system 100 to begin the testing and measurement cycle. In other instances, the microcontroller 102 may begin the testing and measurement cycle after the previous actions have been completed. In some embodiments, the testing and measurement cycle may include introducing a fluid (e.g., air, liquid, vapor, etc.) at a known pressure through the pressure sensor 110. In other embodiments, the testing and measurement cycle may include one or more cycles where a fluid (e.g., air, liquid, vapor, etc.) is introduced at different stages in each cycle, the pressure of the fluid being known at each stage. After beginning the testing and measurement cycle, the testing and measurement cycle will continue for a predetermined amount of time or cycles before the testing and measurement cycle is complete.

The pressure measurements from the pressure sensor 110 are then compared (action 512). For example, in one embodiment, the microcontroller 102 compares the known pressure imparted by the test fixture 108 to the pressure identified by the pressure sensor 110. In another embodiment, the microcontroller 102 compares the true atmospheric pressure to the atmospheric pressure identified by the pressure sensor 110.

The results of the comparison are then displayed (action 514). For example, in some embodiments the pressure identified by the pressure sensor 110 is displayed on the display 112 in the form of the graph 400 during the testing process (e.g., the graph 400 is continuously updated throughout the testing process). In other embodiments, the pressure identified by the pressure sensor 110 is displayed on the display 112 in the form of the graph 400 after the testing process is complete (e.g., the graph 400 is not displayed to the user until all testing cycles are finished). In some implementations, the graph 400 includes an additional line indicating the known pressure imparted by the test fixture 108 and/or the true atmospheric pressure. The additional line may be overlaid on top of the line 406 and include boundaries indicating the allowable threshold (e.g., plus or minus 10 percent) such that the user can view the pressure(s) identified by the pressure sensor 110 as compared to the known pressure(s).

The functionality of the pressure sensor is then determined (action 516). For example, in some instances, the user views the results displayed and determines whether the pressure sensor 110 is functioning properly by comparing the pressure(s) identified by the pressure sensor 110 with the known pressure(s). If the identified pressure(s) fall outside the allowable threshold, the user may determine that the pressure sensor 110 is not operating properly. If the identified pressure(s) fall inside the allowable threshold, the user may determine that the pressure sensor 110 is operating properly. In other instances, the microcontroller 102 determines the functionality of the pressure sensor 110 by comparing the pressure(s) identified by the pressure sensor 110 with the known pressure(s) and the allowable thresholds and provides an indication of the determination to the user.

Figure 6:
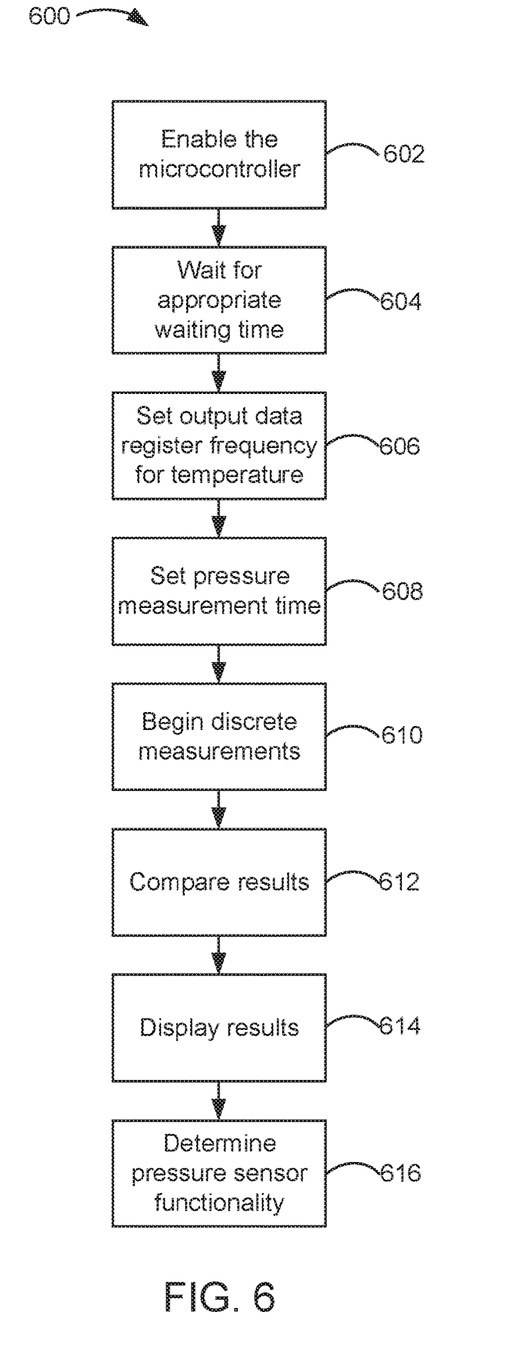
FIG. 6 is a flow diagram of a process for discretely measuring pressure, according to a particular embodiment.

FIG. 6 is a flow diagram of a process 600 for validating the function of a pressure sensor by discretely identifying pressure, according to a particular embodiment. The process 600 may be implemented by the microcontroller 102 of FIG. 1 or the puffing machine 302 of FIG. 3A. For purposes of explanation, the process 600 will be described in terms of the microcontroller 102.

The process 600 begins and the microcontroller 102 is enabled (action 602). For example, in some embodiments user may enable the microcontroller 102 by actuating a switch or button to turn on and enable the microcontroller 102. In other embodiments a user may plug in the microcontroller 102 to turn on and enable the microcontroller 102.

The user then waits for the appropriate waiting time (action 604). For example, after enabling the microcontroller 102, the microcontroller 102 may need to execute some startup tasks or programs in order to prepare itself to send serial peripheral interface ("SPI") commands and/or inter-integrated circuit ("I²C") commands to the device(s) connected to the microcontroller 102. This action may also include time for the microcontroller 102 to clear out any settings that were previously used (e.g., clearing a first in/first out or setting the first in/first out to bypass mode). In some embodiments, the user can clear out the settings previously used, if so desired.

After waiting the appropriate time, the user sets the output data register frequency for temperature (action 606). For example, in some embodiments it may be desirable to measure not only the pressure, but the temperature in the test system 100 to determine if the temperature impacts the function of the test system 100. In such cases, the user can set the frequency of temperature measurement to the desired rate (e.g., 1 Hz.). In some embodiments, the user can also set the number of temperature measurements to take during the testing cycle (e.g., 1 measurement).

The user then sets the pressure measurement time (action 608). For example, in some embodiments the user may only desire to take one pressure measurement instead of continuous pressure measurements. In such a case, the user sets a measurement time equal to the time during which the user desired the pressure sensor 110 to sense the pressure in the testing system 100. For example, the user may set the pressure measurement time to 64 milliseconds such that a single measurement of the pressure in the testing system 100 is read by the pressure sensor 110 within 64 milliseconds of the test cycle commencing. In some embodiments, setting the pressure measurement for a discrete time may also include disabling the test system 100 from conducting a continuous measurement. In some implementations, the microcontroller 102 may automatically disable the continuous measurements. In other implementations, the user may disable the continuous measurements.

The user then begins the discrete measurement cycle (action 610). For example, in some instances the user may actuate a switch or button on the testing system 100 to begin the testing and measurement cycle. In other instances, the microcontroller 102 may begin the testing and measurement cycle after the previous actions have been completed. In some embodiments, the testing and measurement cycle may include introducing a fluid (e.g., air, liquid, vapor, etc.) at a known pressure through the pressure sensor 110. In other embodiments, the testing and measurement cycle may include one or more cycles where a fluid (e.g., air, liquid, vapor, etc.) is introduced at different stages in each cycle, the pressure of the fluid being known at each stage. After beginning the testing and measurement cycle, the testing and measurement cycle will continue for the predetermined testing time.

The pressure measurement from the pressure sensor 110 is then compared (action 612). For example, in one embodiment, the microcontroller 102 compares the known pressure imparted by the test fixture 108 to the pressure identified by the pressure sensor 110. In another embodiment, the microcontroller 102 compares the true atmospheric pressure to the atmospheric pressure identified by the pressure sensor 110.

The results of the comparison are then displayed (action 614). For example, in some embodiments the pressure identified by the pressure sensor 110 is displayed on the display 112 in the form of the graph 400 during the testing process (e.g., the graph 400 is updated as the pressure measurement is determined). In other embodiments, the pressure identified by the pressure sensor 110 is displayed on the display 112 in the form of the graph 400 after the testing process is complete (e.g., the graph 400 is not displayed to the user until all testing cycles are finished). In some implementations, the graph 400 includes an additional line indicating the known pressure imparted by the test fixture 108 and/or the true atmospheric pressure. The additional line may be overlaid on top of the line 406 and include boundaries indicating the allowable threshold (e.g., plus or minus 10 percent) such that the user can view the pressure(s) identified by the pressure sensor 110 as compared to the known pressure(s). In some instances, the pressure measurement from the pressure sensor 110 is displayed on the display 112 as a single number instead of in the form of the graph 400.

The functionality of the pressure sensor is then determined (action 616). For example, in some instances, the user views the results displayed and determines whether the pressure sensor 110 is functioning properly by comparing the pressure(s) identified by the pressure sensor 110 with the known pressure(s). If the identified pressure(s) fall outside the allowable threshold, the user may determine that the pressure sensor 110 is not operating properly. If the identified pressure(s) fall inside the allowable threshold, the user may determine that the pressure sensor 110 is operating properly. In other instances, the microcontroller 102 determines the functionality of the pressure sensor 110 by comparing the pressure(s) identified by the pressure sensor 110 with the known pressure(s) and the allowable thresholds and provides an indication of the determination to the user.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A testing system for validating the performance of a pressure sensor comprising:
   a test fixture configured to be operatively connected to the pressure sensor, the pressure sensor configured to identify a fluid pressure relative to an atmospheric pressure;
   a microcontroller in electrical communication with the test fixture and the pressure sensor, the microcontroller configured to:
      cause the test fixture to introduce air and/or vapor at a known fluid pressure through the pressure sensor and receive the identified fluid pressure from the pressure sensor, the identified fluid pressure being based on the air and/or vapor flowing through the pressure sensor; and
      make a determination regarding the performance of the pressure sensor, the determination being based on the identified fluid pressure and the atmospheric pressure; and
   a display in electrical communication with the microcontroller, the display configured to display results to a user, the results comprising the identified fluid pressure and the atmospheric pressure.

2. The testing system of claim 1, further comprising:
   a power source in electrical communication with the microcontroller;
   a first signal conditioner in electrical communication with the power source; and
   a second signal conditioner in electrical communication with the first signal conditioner and the microcontroller, the first signal conditioner and the second signal conditioner configured to reduce signal noise from the power source to the microcontroller.

3. The testing system of claim 2, wherein the microcontroller is configured to make a comparison of the identified fluid pressure and the atmospheric pressure.

4. The testing system of claim 3, wherein the determination is based on the comparison, the determination being whether the identified fluid pressure is within a predetermined range of the atmospheric pressure.

5. The testing system of claim 4, wherein the microcontroller is configured to provide a communication to a user via the display, the communication including the results and the determination.

6. The testing system of claim 5, wherein the display is configured to show a chart, the chart providing information concerning the atmospheric pressure and the identified fluid pressure.

7. The testing system of claim 1, wherein the pressure sensor is configured to continuously identify the fluid pressure relative to the atmospheric pressure.

8. A testing system for validating the performance of a pressure sensor, comprising:
   a puffing machine coupled to a pressure sensor, the pressure sensor configured to identify an inhalation pressure relative to an atmospheric pressure and an exhalation pressure relative to the atmospheric pressure, the puffing machine configured to provide a known inhalation pressure and a known exhalation pressure through the pressure sensor;
   a microcontroller in electrical communication with the puffing machine and the pressure sensor, the microcontroller configured to:
      cause the puffing machine to introduce air and/or vapor through pressure sensor at the known inhalation pressure and introduce air and/or vapor to the pressure sensor at the known exhalation pressure and receive the identified inhalation pressure and the identified exhalation pressure from the pressure sensor, the identified inhalation pressure being based on the air and/or vapor flowing through the pressure sensor at the known inhalation pressure, and the identified exhalation pressure being based on the air and/or vapor flowing through the pressure sensor at the known exhalation pressure; and
      make a determination regarding the performance of the pressure sensor, the determination being based on the identified inhalation pressure, the identified exhalation pressure, the atmospheric pressure, the known inhalation pressure, and the known exhalation pressure; and
   a display in electrical communication with the microcontroller, the display configured to display results to a user, the results comprising the identified inhalation pressure, the identified exhalation pressure, the known inhalation pressure, the known exhalation pressure, and the atmospheric pressure.

9. The testing system of claim 8, further comprising:
   a housing containing a cartridge, an atomizer, and the pressure sensor;
   the cartridge in communication with the puffing machine and the atomizer, the atomizer in communication with the pressure sensor.

10. The testing system of claim 9, wherein the cartridge contains a liquid, and the atomizer is configured to heat the liquid to convert the liquid to a vapor when the puffing machine provides the inhalation pressure, the vapor being in contact with the pressure sensor.

11. The testing system of claim 10, further comprising:
   a power source in electrical communication with the microcontroller;
   a first signal conditioner in electrical communication with the power source; and
   a second signal conditioner in electrical communication with the first signal conditioner and the microcontroller, the first signal conditioner and the second signal conditioner configured to reduce signal noise from the power source to the microcontroller.

12. The testing system of claim 8, wherein the microcontroller is configured to make a comparison of the identified inhalation pressure, the identified exhalation pressure, the atmospheric pressure, the known inhalation pressure, and the known exhalation pressure.

13. The testing system of claim 12, wherein the determination is based on the comparison, the determination being whether the identified inhalation pressure and the identified exhalation pressure are within a predetermined range of the atmospheric pressure.

14. The testing system of claim 13, wherein the microcontroller is configured to provide a communication to a user via the display, the communication including the results and the determination.

15. A method for testing a pressure sensor to validate the performance of the pressure sensor, the method comprising:
providing a testing system, the testing system comprising:
a test fixture configured to be operatively connected to a pressure sensor, the pressure sensor configured to identify a fluid pressure relative to an atmospheric pressure;
a microcontroller in electrical communication with the test fixture and the pressure sensor; and
a display in electrical communication with the microcontroller, the display configured to display results to a user, the results comprising the identified fluid pressure and the atmospheric pressure;
causing the test fixture to introduce air and/or vapor at a known fluid pressure through the pressure sensor;
identifying the fluid pressure of the air and/or vapor flowing through the pressure sensor;
making a determination regarding the performance of the pressure sensor, the determination being based on the identified fluid pressure and the atmospheric pressure; and
displaying fluid pressure results on a display.

16. The method of claim 15, further comprising:
setting a pressure measurement collection frequency; and
identifying the fluid pressure at the pressure measurement collection frequency.

17. The method of claim 15, further comprising:
making a comparison of the identified fluid pressure to the atmospheric pressure.

18. The method of claim 17, wherein the determination is based on the comparison, the determination being whether the identified fluid pressure is within a predetermined range of the atmospheric pressure.

19. The method of claim 18, further comprising:
providing a communication to a user via the display, the communication including the results and the determination.

20. The method of claim 19, wherein the display is configured to show a chart, the chart providing information concerning the atmospheric pressure and the identified fluid pressure.

* * * * *